United States Patent [19]

Wiezer et al.

[11] Patent Number: 4,471,417
[45] Date of Patent: Sep. 11, 1984

[54] POLY-BIS-TRIAZINYLIMIDES, THEIR PREPARATION

[75] Inventors: Hartmut Wiezer, Gersthofen; Gerhard Pfahler, Augsburg, both of Fed. Rep. of Germany

[73] Assignee: Hoechst Aktiengesellschaft, Fed. Rep. of Germany

[21] Appl. No.: 362,878

[22] Filed: Mar. 29, 1982

[30] Foreign Application Priority Data

Apr. 3, 1981 [DE] Fed. Rep. of Germany ....... 3113455

[51] Int. Cl.³ .......................................... C07D 401/14
[52] U.S. Cl. .................................... 544/113; 544/198; 544/207; 544/209; 260/243.3; 528/423
[58] Field of Search ............... 544/198, 207, 209, 113; 260/243.3; 528/423

[56] References Cited

U.S. PATENT DOCUMENTS 4,263,434 4/1981 Cassandrini et al. ................ 544/198
4,288,593 9/1981 Rody .................................... 544/198
4,321,374 3/1982 Morimura et al. ................... 544/198

FOREIGN PATENT DOCUMENTS 13665 7/1980 European Pat. Off. .
0013682 8/1980 European Pat. Off. .
2333821 7/1977 France .
2372187 6/1978 France .

Primary Examiner—John M. Ford
Attorney, Agent, or Firm—Connolly and Hutz

[57] ABSTRACT

Poly-bis-triazinylimides of the formula

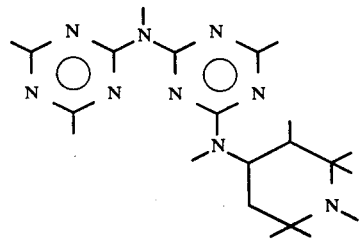

are prepared from bis-(2,4-dichloro-1,3,5-triazin-6-yl)imides and polyalkylpiperidylamines.

They are used as light stabilizers for polymers.

3 Claims, No Drawings

POLY-BIS-TRIAZINYLIMIDES, THEIR PREPARATION

The invention relates to new poly-bis-triazinylimides, a process for their preparation, and their use as stabilizers for synthetic polymers.

The new poly-bis-triazinylimides correspond to the formula (I)

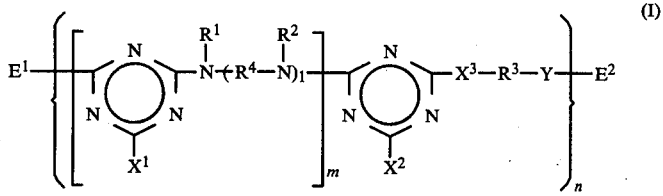

in which l denotes 0 or 1, preferably 0, m is also 0 or 1, preferably 1, and n represents an integer from 1 to 100, preferably 1 to 25 and especially 1 to 10 and, very particularly preferentially, 2 to 10. $X^1$ and $X^2$ represent identical or different, preferably identical, radicals and denote chlorine, phenyl, —OH, —ONa or a group of the formula (II), (III), (IV) or (V), preferably (II), (III) or (IV) and especially (II) or (IV).

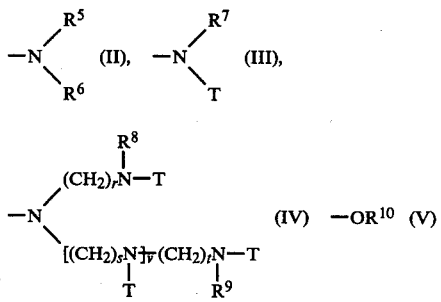

In formula (II), $R^5$ denotes hydrogen, or $C_1$- to $C_{18}$-alkyl, or $C_5$- to $C_{12}$-cycloalkyl which is preferably unsubstituted, but which is, if appropriate, also substituted by a $C_1$- to $C_4$-alkyl group, or denotes $C_3$–$C_{12}$-alkenyl, or phenyl which is preferably unsubstituted, but which is, if desired, substituted by one or two Cl atoms or by one or two $C_1$- to $C_4$-alkyl groups or by $C_1$- to $C_4$-alkoxy or $C_1$- to $C_2$-carboalkoxy, or denotes $C_7$- to $C_{14}$-phenylalkyl, preferably $C_7$- to $C_9$-phenylalkyl, or a group of the formula (VI)

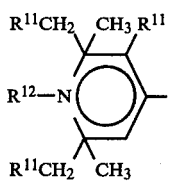

and, in formula (VI), $R^{11}$ is then hydrogen or methyl, preferably hydrogen, and $R^{12}$ is hydrogen or $C_1$- to $C_4$-alkyl which can be substituted by one or two OH groups, or is 2,3-epoxypropyl, allyl or benzyl, but is preferably hydrogen.

$R^6$ is identical to, or different from, $R^5$ and has the meanings indicated under $R^5$ and additionally denotes $C_3$- to $C_{21}$-alkoxyalkyl, preferably $C_1$- to $C_{18}$-alkoxypropyl and especially $C_1$- to $C_2$-alkoxypropyl, $C_1$- to $C_{18}$-, preferably $C_1$- to $C_4$-, hydroxyalkyl, or dimethylamino-$C_2$- to $C_5$-alkyl or diethylamino-$C_2$- to $C_5$-alkyl.

$R^5$ and $R^6$ can also, together with the N atom linking them, represent a pyrrolidine ring or a piperidine, morpholine or hexamethyleneimine ring which is unsubstituted or substituted by up to 4 $C_1$- to $C_4$-alkyl groups, preferably methyl groups.

In formula (III), $R^7$ has the meanings indicated under 

$R^6$ and T represents a group of the formula (VII)

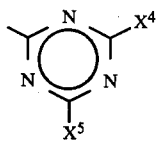

in which $X^4$ and $X^5$ are identical or different radicals of the formula (II), (IV) or (V), preferably (II) or (IV).

In the formula (IV) the indices r, s and t denote identical or different integers from 2 to 6, preferably 2 or 3, v denotes an integer from 0 to 3, preferably 0 or 1 and especially 0, and $R^8$ and $R^9$ represent identical or different radicals having the same meaning as $R^5$, and preferably represent hydrogen or a group of the formula (VI), especially hydrogen, and T has the meanings indicated above.

In formula (V) $R^{10}$ represents the radicals listed under $R_5$.

If m is 0, $X^2$ in formula (I) denotes a radical of the formula (III). If l is 0 and m is 1, $R^1$ in formula (I) represents one of the radicals listed under $R^6$. If l is 1 and n is 1, $R^1$ in formula (I) has the meanings indicated above and additionally represents T. If n is 1 and Y, $R^3$ and $E^2$ have no meaning, $X^3$ represents a radical of the formula (II), (IV) or (V), preferably (II) or (IV), or a chlorine atom. If n>1, $X^3$ additionally represents the radical

in which $R^{13}$ is one of the radicals listed under $R^5$ or is hydroxyalkyl, and Y represents the group

in which the $R^{14}$s are identical or different radicals $R^5$. $R^2$ is identical to, or different from, $R^1$ and has the meanings indicated for $R^1$. $R^3$ and $R^4$ are identical or different and represent a bond, $C_1$- to $C_{18}$-alkylene, preferably $C_2$- to $C_{12}$-alkylene, especially $C_2$- to $C_6$-alkylene. $C_2$- to $C_{12}$-bis-(propoxy)-alkylene, or $C_6$- to $C_{18}$-, preferably $C_6$- to $C_{12}$-, monocycloalkylene, dicycloalkylene or tricycloalkylene which is unsubstituted or substituted by up to four methyl groups and in which, in the case first mentioned, two C atoms can be replaced by N atoms which can carry propylene groups, or $R^3$ and $R^4$ represent $C_6$- to $C_{18}$-arylene, preferably phenylene, or $C_7$- to $C_{18}$-aralkylene.

Instead of the groupings

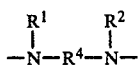

or $-X^3-R^3-Y-$, it is also possible for piperazinylene radicals or bicyclic radicals which have 5 to 12 C atoms, and carry one N atom in the ring and are substituted by an amino and/or aminomethylene group, to be present.

$E^1$ is a halogen atom or a radical of the formula (II), (III), (IV) or (V), preferably a halogen atom or a radical of the formula (II) or (IV), or represents the group $-X^3-R^3-YH$ or $HX^3-R^3-Y-$ wherein $X^3$, $R^3$ and Y have the meanings indicated above. $E^2$ represents hydrogen or has no meaning.

In formula (I), at least one of the radicals $X^1$, $X^2$, $X^3$, Y, $R^1$, $R^2$ or $E^1$ must contain a group of the formula (VI). It is also a condition that, if m is 0, $X^2$, $X^3$ or $E^1$ is a group of the formula (III), or, if l and n are 1, $R^1$ and/or $R^2$ denote T. Compounds of the formula (I) which are particularly preferred are those in which m is 1, l is 0 and n is >1. The compounds of the formula (I) in which n is >1 have an isotactic structure if $X^3$ and Y are identical, or an atactic structure if $X^3$ and Y are different.

The poly-bis-triazinylimides can be obtained in the following manner:

Firstly, the bis-triazinylimides which can be regarded as the starting material are synthesized by reacting a substituted triazinylamine of the formula (1)

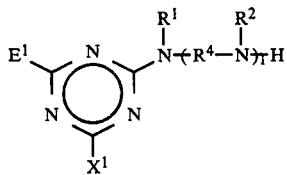

in which $E^1$, $X^1$, $R^1$, $R^2$, $R^4$ and l have the meanings indicated above, l is preferably 0 and $E^1$ and/or $X^1$ are preferably chlorine, with an equimolar quantity, relative to NH amide groups, of cyanuric chloride at $-5°$ to $+10°$ C., preferably 0° to 5° C. These triazinylimides of the formula (A')

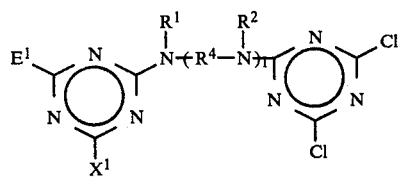

in which $E^1$, $X^1$, $R^1$, $R^2$, $R^4$ and l have the meanings indicated above, are reacted, in a process stage A, at 10 to 70, preferably 40 to 70 and especially 50 to 70, °C., with a 0.95 times equivalent to 1.0 times equivalent, preferably an equivalent, quantity of a compound of the formula (II), (IV) or (V) in which the free valence is saturated by H, or, if appropriate, a mixture of such compounds, in order to achieve the replacement of one of the chlorine atoms present in each of the individual triazine rings.

In process stage B, the remaining chlorine atoms of the triazinylimides prepared in accordance with process stage A are then replaced by reacting them, at 50 to 200, preferably 100 to 180 and especially 130 to 180, °C., with a 0.95 times equivalent to 1.05 times equivalent, preferably an equivalent, quantity of a compound of the formula (II), (IV) or (V) in which the free valence is saturated by H, or, if appropriate, a mixture of such compounds.

The polymeric triazinylimides are obtained in process stage C either by using, as the starting material, a product of the formula (A') containing two chlorine atoms in a triazine ring, in which formula the radicals $R^1$ and $R^2$ must not contain chlorine, l and $R^4$ have the meanings indicated above and $E^1$ and $X^1$ represent the radicals indicated above, but with the exception of chlorine, or by employing a bis-triazinylimide which is accessible as described in process stage A, contains one chlorine atom in each triazine ring and has the formula (B')

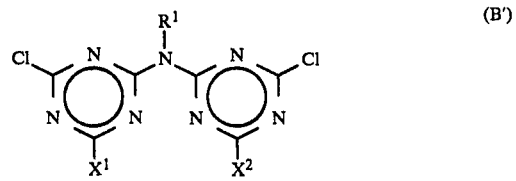

in which formula $R^1$, $X^1$ and $X^2$ have the meanings indicated above, but $X^1$ and $X^2$ must not be chlorine, and carrying out a reaction with a diamine of the formula (D)

$$H-X^3-R^3-Y-H \quad (D),$$

in which formula $X^3$, $R^3$ and Y have the meanings which are indicated above, but which are limited to the bifunctional compounds. A 0.8 to 1.2 times equimolar, preferably 0.95 to 1.05 times equimolar, especially an equimolar, quantity of diamine is employed and the reaction is carried out at 50 to 200, preferably 100 to 180 and especially 130 to 180, °C.

The products obtained in the individual process stages are generally isolated in each case, but it is also possible to carry out the successive reaction steps without isolating the intermediate stages, which makes the process particularly simple.

The products according to the invention are colorless to yellowish resins which, of course, do not have sharp melting points.

All the reactions are carried out in inert organic solvents, such as, for example, petroleum ether, gasoline fractions, acetone, ether, dioxane, benzene, toluene, xylene, mesitylene or mixtures thereof. Inorganic bases are also added in equivalent quantities as hydrogen halide acceptors. Examples of suitable inorganic bases are sodium hydroxide, potassium hydroxide, sodium carbonate and potassium carbonate in a solid form or in aqueous solution.

The following are examples of starting bis-(2,4-dichloro-1,3,5-triazin-6-yl)-imides of the formula (A'):
1. Methyl-bis-(2,4-dichloro-1,3,5-triazin-6-yl)-imide
2. Ethyl-bis-(2,4-dichloro-1,3,5-triazin-6-yl)-imide
3. Butyl-bis-(2,4-dichloro-1,3,5-triazin-6-yl)-imide 4. 2-Ethyl-hexyl-bis-(2,4-dichloro-1,3,5-triazin-6-yl)-imide
5. Hexyl-bis-(2,4-dichloro-1,3,5-triazin-6-yl)-imide
6. Dodecyl-bis-(2,4-dichloro-1,3,5-triazin-6-yl)-imide
7. Octadecyl-bis-(2,4-dichloro-1,3,5-triazin-6-yl)-imide
8. Cyclohexyl-bis-(2,4-dichloro-1,3,5-triazin-6-yl)-imide
9. Benzyl-bis-(2,4-dichloro-1,3,5-triazin-6-yl)-imide
10. 2,4-Dichlorophenyl-bis-(2,4-dichloro-1,3,5-triazin-6-yl)-imide
11. 3-Methoxypropyl-bis-(2,4-dichloro-1,3,5-triazin-6-yl)-imide
12. N,N,N',N'-Tetrakis-(2,4-dichloro-1,3,5-triazin-6-yl)-1,6-diimidohexane
13. 2,4,6-Tris-[dodecyl-(2,4-dichloro-1,3,5-triazin-6-yl)-imido]-1,3,5-triazine.

The following are examples of triazine compounds of the formula (1) which result in compounds according to the invention when reacted with cyanuric chloride:

14. 2,4-Bis-[N-(2,2,6,6-tetramethyl-4-piperidyl)-3-methoxypropylamino]-6-(3-methoxy)-propylamino-1,3,5-triazine
15. 2-[N-(2,2,6,6-Tetramethyl-4-piperidyl)-3-methoxypropylamino]-4-cyclohexylamino-6-chloro-1,3,5-triazine
16. N,N'-Bis-[2,4-bis-<N-(2,2,6,6-tetramethyl-4-piperidyl)-3-methoxypropylamino>-1,3,5-triazin-6-yl]-1,6-diaminohexane.

The following are examples of monofunctional amino compounds derived from the formulae (II) and (IV):

17. 2,2,6,6-Tetramethyl-4-aminopiperidine
18. 2,2,6,6-Tetramethyl-4-butylaminopiperidine
19. 2,2,6,6-Tetramethyl-4-octadecylaminopiperidine
20. 2,2,6,6-Tetramethyl-4-(3-methoxy)-propylaminopiperidine
21. 2,2,6,6-Tetramethyl-4-(3-dimethylamino)-propylaminopiperidine
22. Ammonia
23. Methylamine
24. Butylamine
25. Hexylamine
26. Dodecylamine
27. 2-Ethylhexylamine
28. Octadecylamine
29. Cyclohexylamine
30. Benzylamine
31. 3-Methoxypropylamine
32. 3-Octadecyloxypropylamine
33. 3-Dimethylaminopropylamine
34. Diethylamine
35. Dibutylamine
36. Dicyclohexylamine
37. Dioctadecylamine
38. 1,9-Bis-[2,4-bis-<N-(2,2,6,6-tetramethyl-4-piperidyl)-3-methoxypropylamino>-1,3,5-triazin-6-yl]-1,5,9-triazanonane
39. 1,7-Bis-[2,4-bis-<N-(2,2,6,6-tetramethyl-4-piperidyl)-3-methoxypropylamino>-1,3,5-triazin-6-yl]-1,4,7-triazaheptane
40. 1,5,12-Tris-[2,4-bis-<N-(2,2,6,6-tetramethyl-4-piperidyl)-3-methoxypropylamino>-1,3,5-triazin-6-yl]-1,5,8,12-tetraazadodecane
41. 2-Aminopropan-1-ol
42. 2,2,6,6-Tetramethyl-4-(3-ethoxy)-propylaminopiperidine The following are examples of bifunctional amino compounds of the formula (D):

43. 1,2-Diaminoethane
44. 1,3-Diaminopropane
45. 1,6-Diaminohexane
46. 3-Methylaminopropylamine
47. 3-Cyclohexylaminopropylamine
48. 4,7-Dioxadecane-1,10-diamine
49. 4,9-Dioxadodecane-1,12-diamine
50. N,N'-Bis-cyclododecyl-1,6-diaminohexane
51. 1,3-Bis-(aminomethyl)-cyclohexane
52. Bis-(4-aminocyclohexyl)-methane
53. N,N'-Bis-(3-aminopropyl)-piperazine
54. Piperazine
55. 2(3),5(6)-Bis-(aminomethyl)-norbornane (mixture of isomers)
56. 3(4),8(9)-Bis-(aminomethyl)-tricyclo-[5.2.1.0$^{2,6}$]-decane (mixture of isomers)
57. 1-Amino-2-(aminomethyl)-3,3,5-trimethylcyclopentane
58. 1-Amino-3-aza-5,7,7-trimethylbicyclo-[3.3.1]-nonane
59. N,N'-Bis-(2,2,6,6-tetramethyl-4-piperidyl)-1,2-diaminoethane
60. N,N'-Bis-(2,2,6,6-tetramethyl-4-piperidyl)-1,6-diaminohexane
61. N-(2,2,6,6-Tetramethyl-4-piperidyl)-1,6-diaminohexane
62. N,N'-Bis-(2,2,6,6-tetramethyl-4-piperidyl)-1,3-bis-(aminomethyl)-cyclohexane
63. N-(2,2,6,6-Tetramethyl-4-piperidyl)-1,3-bis-(aminomethyl)-cyclohexane
64. N,N'-Bis-(2,2,6,6-tetramethyl-4-piperidyl)-4,7-dioxadecane-1,10-diamine
65. N,N'-Bis-(2,2,6,6-tetramethyl-4-piperidyl)-2(3),5(6)-bis-aminomethyl)-norbornane (mixture of isomers)
66. N-(2,2,6,6-Tetramethyl-4-piperidyl)-2(3),5(6)-bis-(aminomethyl)-norbornane (mixture of isomers)
67. N,N'-Bis-(2,2,6,6-tetramethyl-4-piperidyl)-3(4),8(9)-bis-(aminomethyl)-tricyclo-[5.2.1.0$^{2,6}$]-decane (mixture of isomers)
68. N(N')-(2,2,6,6-Tetramethyl-4-piperidyl)-3(4),8(9)-bis-(aminomethyl)-tricyclo-[5.2.1.0$^{2,6}$]-decane (mixture of isomers).

A large number of triazine stabilizers containing polyalkylpiperidyl groups are known from numerous publications (German Pat. Nos. 2,636,130 and 2,636,144, German Offenlegungsschriften Nos. 2,752,740, 2,933,078, 2,944,729, 3,022,896, 3,027,223 and 3,045,839 and European patent applications Nos. 2,754, 3,542, 13,665 and 14,683). Of these, the nearest in structure to the poly-bis-triazinylimides according to the invention are, without doubt, the poly-bis-triazinylamines described in German Offenlegungsschrift No. 3,045,839 in which two triazine rings linked by a diamino compound form a recurring structural unit.

Although it is indicated in German Offenlegungsschrift No. 2,719,131, page 35, last paragraph, that polyimides can be suitable for stabilization purposes, no details at all are given concerning the definite structure that such imides should have or the properties of individual imides. It can be concluded from this that these imides do not appear to be equal in quality to the polyesters, polyamides, polyurethanes, polyureas and polysilyl esters which are described and designated as particularly advantageous in this Offenlegungsschrift, particularly as no examples of representatives of this class of substances are presented.

It is, therefore, surprising that the new poly-bis-triazinylimides according to the invention are not only of equal quality, but are, on the contrary, markedly superior to the abovementioned compounds which are described as extremely useful in German Offenlegungsschrift No. 2,719,131, this superiority relating to volatility, resistance to extraction by washing, compatibility and effectiveness, ie to all the criteria relevant to industrial uses. It was not to be expected, and must be regarded as completely surprising, that this superiority can be recorded in spite of the presence of the reactive and unstable imide group.

Furthermore, it could not have been foreseen that, in spite of the misgivings regarding their structure, the imides according to the invention would also prove to be at least equal in quality to the triazinylamides of German Offenlegungsschrift No. 3,045,839.

The new poly-bis-triazinylimides can be incorporated without problems into the polymers to be stabilized and are excellently suitable for stabilizing the latter against oxidative degradation induced by light. In addition to their excellent activity as stabilizers, the new stabilizers are distinguished by their compatibility with the polymers to be stabilized, their resistance to migration caused by extraction with aqueous media, which plays an important part in weathering in the open, their heat stability, even at high processing temperatures, and their low volatility, particularly in comparison with Example 1 of German Offenlegungsschrift No. 2,719,131.

As already stated, the new compounds are used as stabilizers for plastics, and prevent damage caused to the latter by the action of oxygen, heat and light. The following are examples of such plastics:

Polymers derived from hydrocarbons having single or double saturation, for example polyolefins, such as polyethylene, which can optionally be crosslinked, polypropylene, polybut-1-ene, polyisobutene, polymethylbut-1-ene, polymethylpent-1-ene, polyisoprene, polybutadiene, polystyrene, copolymers of the monomers on which the said homopolymers are based, such as ethylene-propylene copolymers, propylene-but-1-ene copolymers, propylene-isobutene copolymers, styrene-butadiene copolymers and terpolymers of ethylene and propylene with a diene, such as, for example, hexadiene, dicyclopentadiene or ethylidenenorbornene; and mixtures of the abovementioned homopolymers, such as, for example, mixtures of polypropylene and polyisobutylene or of butadiene-acrylonitrile copolymers and styrene-butadiene copolymers.

Vinyl polymers containing halogen, such as polyvinyl chloride, polyvinylidene chloride and polyvinyl fluoride, polychloroprene and chlorinated rubbers and also copolymers of vinyl chloride and vinylidene chloride with one another and with other olefinically unsaturated monomers.

Polymers derived from $\alpha,\beta$-unsaturated acids and derivatives thereof, such as polyacrylates and polymethacrylates, polyacrylamides and polyacrylonitrile and copolymers thereof with one another and with other vinyl compounds, such as acrylonitrile-butadiene-styrene copolymers, acrylonitrile-styrene copolymers and acrylonitrile styrene-acrylic ester copolymers.

Polymers derived from unsaturated alcohols and amines or acyl derivatives or acetals thereof, such as polyvinyl alcohol, polyvinyl acetate, polyvinyl stearate, polyvinyl benzoate, polyvinyl maleate, polyvinyl butyral, polyallyl phthalate, polyallylmelamine and copolymers thereof with other vinyl compounds, such as ethylene/vinyl acetate copolymers.

Homopolymers and copolymers derived from epoxides, such as polyethylene oxide, or the polymers which are derived from bis-glycidyl ethers.

Polyacetals, such as polyoxymethylene and polyoxyethylene, and polyoxymethylenes containing ethylene oxide as a comonomer.

Polyurethanes and polyureas.

Polycarbonate.

Polyamides and copolyamides derived from diamines and dicarboxylic acids and/or from aminocarboxylic acids or the corresponding lactams, such as polyamide 6, polyamide 6/6, polyamide 6/10, polyamide 11 and polyamide 12.

Polyesters derived from dicarboxylic acids and dialcohols and/or from hydroxycarboxylic acids or the corresponding lactones, such as polyethylene terephthalate, polybutylene terephthalate and poly-1,4-dimethylolcyclohexane terephthalate.

Crosslinked polymers derived from aldehydes on the one hand and from phenols, ureas and melamines on the other hand, such as phenol-formaldehyde resins, urea-formaldehyde resins and melamine-formaldehyde resins.

Finally, the new compounds can also be employed as stabilizers in the resin and paint industry. Examples of these are thermosetting and thermoplastic acrylic resins which are used for automobile finishes [Encyclopedia of Polymer Science and Technology, Interscience Publishers, New York, Volume 1 (1964), pages 273–276 and Volume 13 (1970), pages 530–532; and "Understanding Paint" by W. R. Fuller, in American Paint Journal Co., St. Louis, 1965, pages 124–135], acrylic resin lacquers, ie the customary stoving lacquers [described, for example, in H. Kittel's "Lehrbuch der Lacke und Beschichtungen" ("Text-book of Lacquers and Coatings"), Volume 1, Part 2, pages 735 and 742 (Berlin, 1972) and in H. Wagner, H. F. Sarx "Lackkunstharze" ("Synthetic Resins for Paint"), pages 229–235] and, very particularly, mixtures based on a hot-crosslinkable acrylic resin and styrene and also lacquers and coatings based on acrylic/melamine resin and alkyd/acrylic/melamine resin. Lacquers of this type can contain, as further additives, other customary light stabilizers, phenolic antioxidants, pigments, dyestuffs, metal deactivators etc.

A field of particular importance is the stabilization of polyolefins, styrene polymers, polyamides, poly(meth-)acrylates and polyurethanes, for which the compounds are preferentially suitable. Examples of these are polyethylene of high and low density, polypropylene, ethylenepropylene copolymers, polystyrene and styrene-butadieneacrylonitrile terpolymers; and mixtures of polyolefins or of styrene polymers, and polyurethanes based on polyethers or polyesters.

The new stabilizers are incorporated into the polymer compositions by methods which are generally customary. The incorporation can be effected, for example, by mixing the compounds and optionally further additives into the melt by the methods customary in the art, before or during shaping, or by applying the compounds as a solution or dispersion to the polymer directly or by mixing the compounds into a solution, suspension or emulsion of the polymer, if appropriate with subsequent evaporation of the solvent. The quantities are 0.01 to 5, preferably 0.05 to 2.5 and especially 0.1 to 1.0, % by weight, relative to the material to be stabilized. The new compounds can also be added in the form of a master batch containing these compounds, for example in a concentration of 1 to 50, preferably 2.5 to 20, % by weight, to the plastics to be stabilized.

The plastics which have been stabilized by adding the substances according to the invention can, if desired, also contain other known and customary additives, such as, for example, antioxidants based on phenols and sulfides, metal deactivators and light stabilizers, phosphite stabilizers, metal compounds, epoxy stabilizers and polyhydric alcohols (see also German Offenlegungsschrift No. 2,427,853, pages 18–24).

Examples of antioxidants are sterically hindered phenols, such as 2,6-di-tert.-butyl-4-methylphenol. 4,4-butylidene-bis-(2,6-di-tert.-butylphenol), 4,4'-thio-bis-(2-tert.-butyl-5-methylphenol), 2,5-di-tert.-butyl-4-hydroxyanisole, dioctadecyl 2,2-bis-(3,5-di-tert.-butyl-2-hydroxybenzyl)-malonate, 1,3,5-tris-(3,5-di-tert.-butyl-4-hydroxybenzyl)-2,4,6-trimethylbenzene and 2,4,6-tri-(3,5-di-tert.-butyl-4-hydroxybenzyl)-phenol, phenolic triazine compounds, such as 1,3,5-tris-(3,5-di-tert.-butyl-4-hydroxybenzyl) isocyanurate, esters of β-(3,5-di-tert.-butyl-4-hydroxyphenyl)-propionic acid with, for example, octadecanol, pentaerythritol and tris-hydroxyethyl isocyanurate, esters of 3,3-bis-(3-tert.-butyl-4-hydroxyphenyl)-butanoic acid with, for example, ethylene glycol, esters of thiodipropionic acid with fatty alcohols, Ca salts or Ni salts of ethyl 3,5-di-tert.-butyl-4-hydroxybenzyl phosphate, dioctadecyl sulfide and dioctadecyl disulfide.

The UV absorbers and light stabilizers include 2-(2'-hydroxyphenyl)-benztriazoles, such as, for example, the 5-chloro-3',5'-di-tert.-butyl and 5-chloro-3',5'-di-tert.-amyl derivative, 2-hydroxybenzophenones, such as, for example, the 4-heptoxy or 4-octoxy derivative, salicylates, such as octylphenyl salicylate, nickel complexes, such as, for example, complexes of 2,2'-thio-bis-4-(1,1,3,3-tetramethylbutyl)-phenol with butylamine or other amines, oxalic acid diamides and sterically hindered amines.

Phosphites which should be mentioned are aliphatic, aromatic or aliphatic-aromatic phosphites, such as, for example, tris-nonylphenyl phosphite, tris-(2,4-di-tert.-butylphenyl) phosphite, tris-(2-tert.-butylphenyl) phosphite or esters of pentaerythritol phosphite.

Metal compounds which are known as stabilizers are to be understood as meaning the following: the calcium, barium, strontium, zinc, cadmium, magnesium, aluminum and lead soaps of aliphatic carboxylic acids or hydroxycarboxylic acids having about 12 to 32 C atoms, salts of the said metals with aromatic carboxylic acids, such as benzoates or salicylates, and (alkyl)-phenates of these metals, and also organotin compounds, such as, for example, dialkyltin thioglycolates and carboxylates.

Examples of known epoxy stabilizers are epoxidized higher fatty acids, such as epoxidized soya bean oil, tall oil or linseed oil, or epoxidized butyl oleate and epoxides of long-chain olefins.

Examples of polyhydric alcohols can be pentaerythritol, trimethylolpropane, sorbitol or mannitol, ie. preferably alcohols having 5 or 6 C atoms and 2 to 6 OH groups.

An effective combination of stabilizers for polyα-olefins, such as, for example, high-pressure, medium-pressure and low-pressure polymers of $C_2$- to $C_4$-α-olefins, in particular polyethylene and polypropylene, or copolymers of such α-olefins, is composed, relative to 100 parts by weight of polymer, of, for example, 0.01 to 5 parts by weight of one of the compounds to be used in accordance with the invention, 0.05 to 5 parts by weight of a phenolic stabilizer, if appropriate 0.01 to 5 parts by weight of a sulfur-containing co-stabilizer and, if appropriate, 0.01 to 3 parts by weight of a basic or neutral metal soap, such as, for example, calcium stearate or zinc stearate, or the corresponding oxides, and, if appropriate, 0.01 to 5 parts by weight of a known UV stabilizer belonging to the group comprising alkoxyhydroxybenzophenones, 4-hydroxyphenylbenztriazoles and benzylidenemalonic acid mononitrile-esters or the so-called quenchers, such as, for example, nickel chelates. Plasticizers, lubricants, emulsifiers, fillers, such as, for example, chalk, talc, asbestos, pigments, optical brighteners, flameproofing agents and antistatic agents can be regarded as examples of other customary additives.

The plastics which have been stabilized in accordance with the invention can be used in a very wide variety of forms, for example as sheets, fibers, tapes or profiles or as binders for paints, adhesives or plastic cements.

The following examples serve to illustrate the invention in greater detail:

EXAMPLES

In the preparation examples which follow, the starting materials employed are characterized by numbers which relate to the numbering of the substances listed on pages 9 to 12. Since the process products are resins, the data relating to the melting points are "approximate" figures. If "resin" alone is indicated, this product has the consistency of a soft resin.

EXAMPLE 1

200 ml of toluene and 100 ml of acetone were initially introduced into a stirred apparatus and were cooled to 10° C. After adding 38.5 g (0.1 mole) of the compound 11 (educt 1), 45.6 g (0.2 mole) of the compound 20 (educt 2) were added dropwise. The mixture was then heated to 50° C. and 32 g (0.2 mole) of 25% strength NaOH were added dropwise in the course of 2 hours. The mixture was stirred for a further 4 hours at 50° C. and filtered and the upper organic phase of the filtrate was separated off, dried over $Na_2SO_4$ and concentrated to dryness in vacuo. The residue was dried in a high vacuum. 74 g of a colorless resin, melting point 130° C., of the following structure:

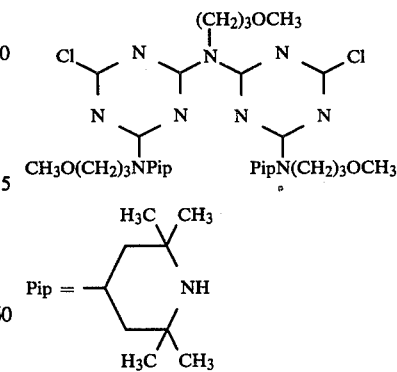

Analysis: Cl, calculated: 9.23%; found: 9.1%

EXAMPLES 2 TO 20

The procedure followed was analogous to that of Example 1, using different educts.

| Example No. | Starting materials Educt 1 Compound No. (g ≙ mole) | Educt 2 Compound No. (g ≙ mole) | Product of the process m.p. (°C.) |
|---|---|---|---|
| 2 | 11 (38.5 ≙ 0.1) | 19 (81.6 ≙ 0.2) | Resin |
| 3 | 3 (36.9 ≙ 0.1) | 18 (42.4 ≙ 0.2) | " |
| 4 | 3 (36.9 ≙ 0.1) | 36 (36.2 ≙ 0.2) | ~207 |
| 5(1) | 8 (39.5 ≙ 0.1) | 29 (19.8 ≙ 0.2) | ~230 |
| 6 | 4 (42.5 ≙ 0.1) | 41 (15.0 ≙ 0.2) | 91 |
| 7 | 4 (42.5 ≙ 0.1) | 18 (42.4 ≙ 0.2) | Resin |
| 8 | 3 (36.9 ≙ 0.1) | 11 (45.6 ≙ 0.2) | ~80 |
| 9 | 1 (32.7 ≙ 0.1) | 11 (45.6 ≙ 0.2) | Resin |
| 10 | 5 (39.7 ≙ 0.1) | 42 (48.4 ≙ 0.2) | " |
| 11 | 8 (39.5 ≙ 0.1) | 11 (45.6 ≙ 0.2) | 214 |
| 12 | 3 (9.9 ≙ 0.025) | 38 (59.6 ≙ 0.05) | 104–13 |
| 13 | 1 (32.7 ≙ 0.1) | 18 (42.4 ≙ 0.2) | 126 |
| 14 | 1 (32.7 ≙ 0.1) | 17 (31.2 ≙ 0.2) | >250 |
| 15 | 11 (38.5 ≙ 0.1) | 42 (48.4 ≙ 0.2) | Resin |
| 16 | 7 (56.6 ≙ 0.1) | 18 (42.4 ≙ 0.2) | " |
| 17(2) | 9 (40.3 ≙ 0.1) | 21 (48.2 ≙ 0.2) | ~225 |
| 18(2) | 9 (40.3 ≙ 0.1) | 31 (17.8 ≙ 0.2) | ~180 |
| 19(2) | 4 (42.5 ≙ 0.1) | 21 (48.2 ≙ 0.2) | ~215 |
| 20 | 10 (45.8 ≙ 0.1) | 20 (45.4 ≙ 0.2) | ~95 |

(1)Acetone used as the solvent
(2)The reaction solution was concentrated, taken up in ethanol and filtered and the filtrate was concentrated to dryness.

EXAMPLE 21

15.4 g (0.02 mole) of the compound obtained in Example 1, 9.4 g (0.02 mole) of the compound 67 (described here as educt 3, since the compound was obtained in accordance with Example 1 from educts 1 and 2*) and 1.6 g (0.04 mole) of NaOH powder were stirred in 100 ml of mesitylene in a stirred apparatus for 8 hours at reflux temperature. The mixture was filtered while hot and the filtrate was concentrated to dryness in vacuo. The residue was dried at 120° C. in a high vacuum. This gave 22.5 g of a pale, solid resin, melting point ~115° C., having the following structure.
*This also applies to the examples below

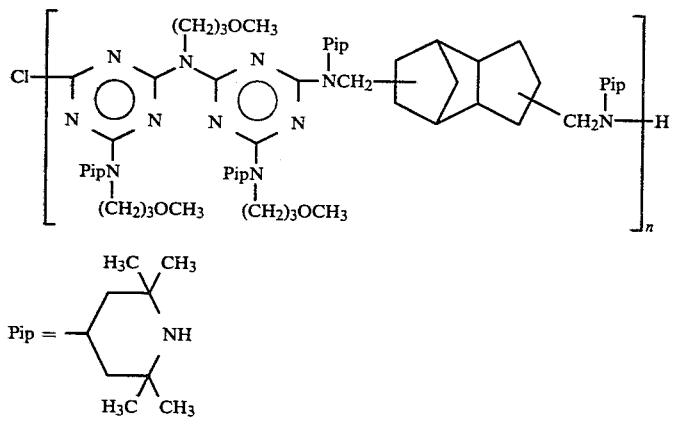

EXAMPLES 22 TO 50

The procedure was analogous to that of Example 21.

| Example No. | Starting materials Compound according to Example No. (g ≙ mole) | Educt 3 Compound No. (g ≙ mole) | Product of the process m.p. (°C.) |
|---|---|---|---|
| 22 | 3 (14.4 ≙ 0.02) | 45 (2.3 ≙ 0.02) | ~90 |
| 23 | 15 (3.9 ≙ 0.005) | 40 (17.7 ≙ 0.01) | ~175 |
| 24 | 1 (15.4 ≙ 0.02) | 20 (9.1 ≙ 0.01) | ~95 |
| 25(1) | 2 (11.3 ≙ 0.01) | 68 (3.3 ≙ 0.01) | Resin |
| 26(1) | 1 (15.4 ≙ 0.02) | 57 (3.0 ≙ 0.02) | " |
| 27(1) | 4 (13.2 ≙ 0.02) | 65 (8.6 ≙ 0.02) | ~150 |
| 28(1) | 1 (15.4 ≙ 0.02) | 61 (5.1 ≙ 0.02) | ~90 |
| 29(1) | 3 (14.4 ≙ 0.02) | 60 (7.9 ≙ 0.02) | ~75 |
| 30 | 9 (14.0 ≙ 0.02) | 60 (7.9 ≙ 0.02) | ~105 |
| 31 | 9 (14.0 ≙ 0.02) | 52 (4.2 ≙ 0.02) | Resin |
| 32 | 7 (13.8 ≙ 0.02) | 58 (3.6 ≙ 0.02) | ~115 |
| 33 | 7 (13.8 ≙ 0.02) | 64 (9.1 ≙ 0.02) | Resin |
| 34 | 1 (15.4 ≙ 0.02) | 53 (4.0 ≙ 0.02) | ~85 |
| 35(2) | 11 (15.6 ≙ 0.02) | 68 (6.6 ≙ 0.02) | Resin |
| 36(2) | 11 (15.6 ≙ 0.02) | 50 (8.0 ≙ 0.02) | " |
| 37(2) | 3 (14.4 ≙ 0.02) | 46 (1.7 ≙ 0.02) | ~135 |
| 38(2) | 8 (15.0 ≙ 0.02) | 65 (8.6 ≙ 0.02) | ~90 |
| 39 | 12 (7.1 ≙ 0.01) | 20 (18.2 ≙ 0.08) | ~90 |
| 40(2) | 3 (7.2 ≙ 0.01) | 17 (3.1 ≙ 0.02) | ~85 |
| 41 | 5 (10.4 ≙ 0.02) | 59 (6.8 ≙ 0.02) | >230 |
| 42 | 19 (16.7 ≙ 0.02) | 49 (4.0 ≙ 0.02) | Resin |
| 43(2) | 18 (16.2 ≙ 0.02) | 43 (1.2 ≙ 0.02) | ~120 |
| 44(2) | 3 (14.4 ≙ 0.02) | 50 (8.0 ≙ 0.02) | ~115 |
| 45(2) | 19 (16.7 ≙ 0.02) | 61 (5.1 ≙ 0.02) | ~55 |
| 46(2) | 6 (10.0 ≙ 0.02) | 62 (8.4 ≙ 0.02) | ~90 |
| 47(1) | 5 (10.4 ≙ 0.02) | 67 (9.4 ≙ 0.02) | ~115 |
| 48(2) | 1 (7.7 ≙ 0.01) | 38 (23.8 ≙ 0.02) | ~105 |
| 49 | 20 (14.0 ≙ 0.02) | 56 (3.9 ≙ 0.02) | ~105 |
| 50 | 10 (11.3 ≙ 0.02) | 67 (9.4 ≙ 0.02) | ~90 |

(1)Refluxed for 20 hours in diethylbenzene
(2)Refluxed for 20 hours in xylene

EXAMPLE 51

This example shows the volatility of the new triazine stabilizers in comparison with products of the nearest state of the art.

The volatilities were determined in an apparatus for thermogravimetric analysis. For this purpose, equal quantities (500 mg) of the compounds according to the invention and of the comparison substances were heated in a nitrogen atmosphere to 300° C. at a rate of heating of 2K/minute, and the loss of substance in mg/cm² of sample surface was measured. The results are shown in the table below:

| Stabilizer according to Example | Loss of weight in mg/cm² on reaching ... °C. | | | |
|---|---|---|---|---|
| | 220 | 260 | 300 | 10 minutes at 300° C. |
| Comparison(1) | 0.16 | 1.11 | 9.48 | 58.46 |

-continued

| Stabilizer according to Example | Loss of weight in mg/cm² on reaching ... °C. | | | |
|---|---|---|---|---|
| | 220 | 260 | 300 | 10 minutes at 300° C. |
| Comparison[2] | 0.16 | 2.05 | 4.42 | 5.21 |
| 36 | 0.16 | 1.74 | 3.16 | 4.26 |
| 20 | 0.32 | 2.37 | 3.63 | 4.90 |

[1] Compound according to Example 1 of German Offenlegungsschrift 2,719,131 (commercial product)
[2] Compound according to Example 14 of German Offenlegungsschrift 3,045,839

EXAMPLE 52

This example is intended to demonstrate the light-stabilizing action of the new compounds in a poly-α-olefin.

100 parts by weight of polypropylene having a melt index i₅ (230° C.) of approx. 6 g/10 minutes (determined as specified in ASTM D 1238-62 T) and a density of 0.90 were mixed with 0.1 part by weight of pentaerythrityl tetrakis-3-(3,5-di-tert.-butyl-4-hydroxyphenyl)-propionate, 0.2 part by weight of calcium stearate and 0.1 part by weight of the stabilizer, according to the invention, to be tested.

In order to achieve as uniform as possible a distribution on the polymer particles, the stabilizers were dissolved in a solvent and the solution was added dropwise to the polypropylene powder, while stirring, the bulk of the solvent being re-evaporated by simultaneous irradiation with an IR lamp. After approx. 20 minutes the calcium stearate was added and mixing was continued for a further 10 minutes. Residues of solvent were removed by drying at 50° C./120 minutes in a drying cabinet.

The polypropylene was injection-molded on a Type SP 50 Windsor injection-molding machine at 240° C. to give sheets measuring 60×60×1 mm. Test specimens as specified in DIN 53,455, mode 3, scaled down in a ratio of 1:3, were punched out of these sheets. The test specimens required as comparison samples were prepared analogously, but omitting the stabilizer to be tested or adding the comparison stabilizers, respectively.

The stability to light was determined by subjecting the samples to irradiation with alternating light in a Xenotest 1200 apparatus made by Original Hanau Quartz-lampen GmbH. The intensity of the radiation was modulated by UV filters (special filter glass, d=1.7 mm). The stability to light was tested as specified in DIN 53,387 (a dry period of 17 minutes, moistening for 3 minutes, a black body temperature of 45° C. and a relative atmospheric humidity during the dry period of 70 to 75%). The exposure time in hours was measured and the elongation at break thereafter was determined at a haul-off rate of 5 cm/minute on a tensile testing machine made by Instron.

| Stabilizer according to Example | Exposure time in hours | Elongation at break determined as % of initial value |
|---|---|---|
| Polypropylene | 260 | 1 |
| Comparison[1] | 600 | 1 |
| Comparison[2] | 1,400 | >50 |
| Comparison[3] | 320 | 1 |
| 36 | 1,400 | >50 |
| 20 | 1,400 | >50 |

[1] The compound according to Example 1 of German Offenlegungsschrift 2,719,131 (commercial product)
[2] The compound according to Example 14 of German Offenlegungsschrift 3,045,839
[3] Without a stabilizer according to the invention

EXAMPLE 53

The constituents of the formulation indicated below were mixed into polypropylene (®Hostalen PPU VP 1770 F made by Hoechst AG) of melt index MFI 190/5=1.9 g/10 minutes (see DIN 53,535), using a laboratory high-speed mixer. The mixture was converted into granules, which were melted in a laboratory extruder under the customary processing conditions and spun, via a spinning pump having an eight-orifice spinning head, into monofilaments which were subsequently stretched in a ratio of 1:3, texturized to give yarn of 40 dtex and woven into test fabrics.

100 parts by weight of polypropylene, 0.2 part by weight of calcium stearate, 0.1 part by weight of ethylene glycol 3,3-bis-(3-tert.-butyl-4-hydroxyphenyl)-butanoate, 0.1 part by weight of dioctadecyl disulfide and 0.3 part by weight of the stabilizer to be tested.

The fabric samples were mounted on a perforated piece of cardboard in such a way that a free aperture with a diameter of approx. 15.5 mm was left. The test specimens were exposed in this form to radiation in the Xenotest X 1200, as described in the preceding example. At specific intervals of time, the fabrics were subjected to load at their centers by means of a weight of diameter 6 mm, exerting a pressure of 0.1 N/mm². The point at which the weight broke through was taken as the time of failure.

| Stabilizer according to Example | Exposure time in hours |
|---|---|
| Polypropylene | <280 |
| Comparison[1] | 1,400 |
| Comparison[2] | >3,100(+) |
| Comparison[3] | 400 |
| 36 | >3,100(+) |
| 20 | >3,100(+) |

[1] The compound according to Example 1 of German Offenlegungsschrift 2,719,131 (commercial product)
[2] The compound according to Example 14 of German Offenlegungsschrift 3,045,839
[3] No stabilizer
(+) The weight had not yet broken through

EXAMPLE 54

The stabilized granules, prepared as in the preceding example, were processed on a laboratory film-blowing machine (screw diameter 25 mm, length 20 D, temperature program 200°, 240°, 250° and 255° C.) to give blown films having a thickness of approx. 70 μm. These films were subjected to artificial weathering in the Xenotest X 1200, as described in Example 52. The carbonyl number was determined, as a characteristic of damage, by a method modeled on DIN 63,383, Part 2. (This number is defined for polypropylene as the ratio of the extinction values at 1,715 cm⁻¹). At a CO number >2, the test specimens begin to decompose into powder.

| Stabilizer according | C = O number after ... hours | | | |
|---|---|---|---|---|
| to Example | 500 | 1,000 | 2,000 | 2,500 |
| Polypropylene | | | | |
| Comparison[1] | >2 | | | |
| Comparison[2] | | >2 | | |
| Comparison[3] | <0.1 | 0.1 | 0.3 | 0.5 |
| 36 | >2 | | | |
| 20 | <0.1 | <0.1 | 0.3 | 0.6 |
| | <0.1 | <0.1 | 0.2 | 0.4 |

[1] [2] and [3] correspond to the comparison samples of Example 50.

We claim:

1. A poly-bis-triazinylamide of the formula (I),

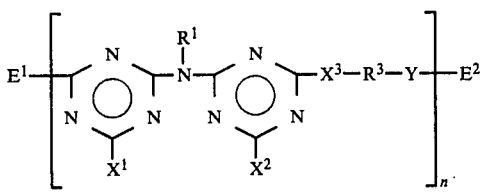

in which n is an integer from 1 to 100, $X^1$ and $X^2$ are identical or different and represent —Cl, phenyl, —OH, —ONa or a group of the formula (II), (III), (IV) or (V)

   (II)

   (III)

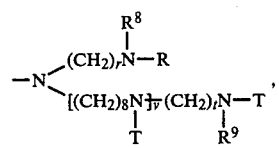   (IV)

—$OR^{10}$,   (V)

in which formulae $R^5$ is hydrogen or $C_1$- to $C_{18}$-alkyl or $C_5$- to $C_{12}$-cycloalkyl which can be substituted by a $C_1$- to $C_4$-alkyl group, or is $C_3$- to $C_{12}$-alkenyl, or phenyl which can be substituted by one or two Cl atoms or by one or two $C_1$- to $C_4$-alkyl groups or by $C_1$- to $C_4$-alkoxy or by $C_1$- or $C_2$-carboalkoxy, or is $C_7$- to $C_{14}$-phenylalkyl, or is a group of the formula (VI)

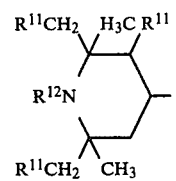   (VI)

and, in formula (VI), $R^{11}$ then represents hydrogen or methyl and $R^{12}$ is hydrogen or $C_1$- to $C_4$-alkyl which can be substituted by one or two OH groups, or represents 2,3-epoxypropyl, allyl or benzyl. $R^6$ has the meanings indicated for $R^5$ and, additionally, can be $C_1$- to $C_{18}$-hydroxyalkyl, $C_3$- to $C_{21}$-alkoxyalkyl or dimethylamino-$C_2$- to $C_5$-alkyl or diethylamino-$C_2$- to $C_5$-alkyl and can be the same as $R^5$ or different, or $R^5$ and $R^6$, together with the N atom linking them, represent a pyrrolidine ring or a piperidine, morpholine or hexamethyleneimine ring which is unsubstituted or substituted by up to two $C_1$- to $C_4$-alkyl groups. $R^7$ has the meanings indicated under $R^6$ and T is a group of the formula (VII)

   (VII)

in which $X^4$ and $X^5$ are identical or different radicals of the formula (II), (IV) or (V), r, s and t represent identical or different integers from 2 to 6, v is an integer from 0 to 3, $R^8$ and $R^9$ represent identical or different radicals having the same meaning as $R^5$, and $R^{10}$ also represents the radicals listed under $R^5$;

$R^1$ is equivalent to $R^6$ or T, except when n is 1, in which case $R^1$ is T;

and if n is 1 and Y, $R^3$ and $E^2$ have no meaning, $X^3$ is the same as or different from $X^2$, or if n>1, $X^3$ is the radical —$NR^{13}$— in which $R^{13}$ is one of the radicals listed under $R^5$, Y represents the group —$NR^{14}$— in which $R^{14}$ represents identical or different radicals $R^5$, $R^3$ either represents a direct bonding or $C_2$- to $C_{18}$-alkylene, $C_2$- to $C_{12}$-bis-(propoxy)-alkylene or monocycloalkylene, dicycloalkylene or tricycloalkylene which is unsubstituted or substituted by up to four methyl groups and in which, in the case first mentioned, two C atoms can be replaced by N atoms which can carry propylene groups, or represent $C_6$- to $C_{18}$-arylene or $C_7$- to $C_{18}$-aralkylene, or piperazinylene radicals or bicyclic radicals which have 5 to 12 C atoms, and carry one N atom in the ring and are substituted by an amino group and/or an aminomethylene group can be present instead of the grouping —$X^3$—$R^3$—Y—, $E^1$ represents a chlorine atom or a radical of the formula (II), (III), (IV) or (V) or the group —$X^3$—$R^3$—YH or H$X^3$—$R^3$—Y—, $E^2$ is hydrogen or has no meaning, and, in the formula (I), at least one of the radicals $X^1$, $X^2$, $X^3$, Y, $R^1$ or $E^1$ must contain a group of the formula (VI)

and, furthermore, the compounds of the formula (I) in which n>1 have an isotactic structure if $X^3$ and Y are identical or have an atactic structure if $X^3$ are different.

2. A poly-bis-triazinylamide of the formula (I),

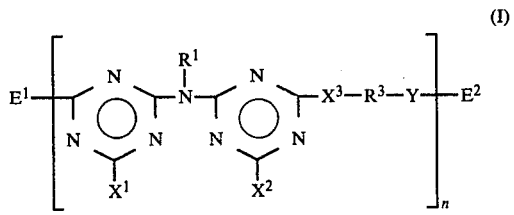

in which n is an integer from 2 to 10, $X^1$ and $X^2$ are identical or different and represent —Cl, phenyl, —OH, —ONa or a group of the formula (II), (III), (IV) or (V) in which n is an integer from 1 to 100, $X^1$ and $X^2$ are identical or different and represent —Cl, phenyl, —OH, —ONa or a group of the formula (II), (III), (IV) or (V)

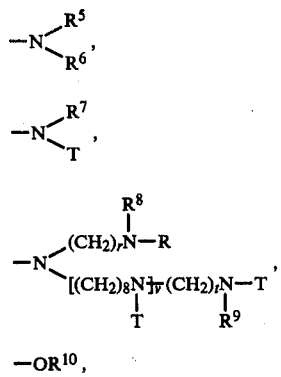

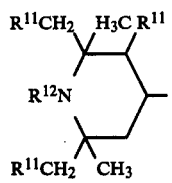

—OR¹⁰,     (V)

in which formulae R⁵ is hydrogen or $C_1$- to $C_{18}$-alkyl or $C_5$- to $C_{12}$-cycloalkyl which can be substituted by a $C_1$- to $C_4$-alkyl group, or is $C_3$- to $C_{12}$-alkenyl, or phenyl which can be substituted by one or two Cl atoms or by one or two $C_1$- to $C_4$-alkyl groups or by $C_1$- to $C_4$-alkoxy or by $C_1$- or $C_2$-carboalkoxy, or is $C_7$- to $C_{14}$-phenylalkyl, or is a group of the formula (VI)

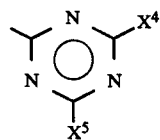

and, in formula (VI), $R^{11}$ then represents hydrogen or methyl and $R^{12}$ is hydrogen or $C_1$- to $C_4$-alkyl which can be substituted by one or two OH groups, or represents 2,3-epoxypropyl, allyl or benzyl, $R^6$ has the meanings indicated for $R^5$ and, additionally, denotes $C_1$- to $C_{18}$-hydroxyalkyl, $C_3$- to $C_{21}$-alkoxyalkyl or dimethylamino-$C_2$- to $C_5$-alkyl or diethylamino-$C_2$- to $C_5$-alkyl and can be the same as $R^5$ or different, or $R^5$ and $R^6$, together with the N atom linking them, represent a pyrrolidine ring or a piperidine morpholine or hexamethyleneimine ring which is unsubstituted or substituted by up to two $C_1$- to $C_4$-alkyl groups, $R^7$ has the meanings indicated under $R^6$ and T is a group of the formula (VII)

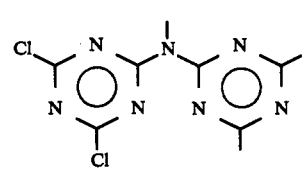

in which $X^4$ and $X^5$ are identical or different radicals of the formula (II), (IV) or (V), r, s and t represents identical or different integers from 2 to 6, v is an integer from 0 to 3, $R^8$ and $R^9$ represent identical or different radicals having the same meaning as $R^5$, and $R^{10}$ also represents the radicals listed under $R^5$, $R^1$ is equivalent to $R^6$ or T, except when n is 1, in which case $R^1$ is the same as T;

and if n is 1 and Y, $R^3$ and $E^2$ have no meaning, $X^3$ is the same as or different from $X^2$, or, if $n > 1$, $X^3$ is the radical —$NR^{13}$— in which $R^{13}$ is one of the radicals listed under $R^5$, Y represents the group —$NR^{14}$— in which $R^{14}$ represents identical or different radicals $R^5$, $R^3$ either represents a direct bonding or $C_2$- to $C_{18}$-alkylene, $C_2$- to $C_{12}$-bis-(propoxy)-alkylene or monocycloalkylene, dicycloalkylene or tricycloalkylene which is unsubstituted or substituted by up to four methyl groups and in which, in the case first mentioned, two C atoms can be replaced by N atoms which can carry propylene groups, or represent $C_6$- to $C_{18}$-arylene or $C_7$- to $C_{18}$-aralkylene, or piperazinylene radicals or bicyclic radicals which have 5 to 12 C atoms, and carry one N atom in the ring and are substituted by an amino group and/or an aminomethylene group can be present instead of the grouping —$X^3$—$R^3$—Y—, $E^1$ represents a chlorine atom or a radical of the formula (II), (III), (IV) or (V) or the group —$X^3$—$R^3$—YH or H$X^3$—$R^3$—Y—, $E^2$ is hydrogen or has no meaning, and in the formula (I), at least one of the radicals $X^1$, $X^2$, $X^3$, Y, $R^1$, or $E^1$ must contain a group of the formula (VI) and, furthermore, the compounds of the formula (I) in which $n > 1$ have an isotactic structure if $X^3$ and Y are identical or have an atactic structure if $X^3$ and Y are different.

3. A process for the preparation of a poly-bis-triazinylimide of the formula (I) in claim 1, which comprises reacting a bis-triazinylimide of the partial structure (C 1) or (C2)

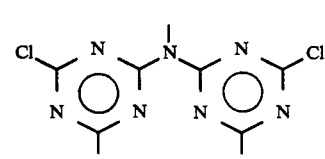

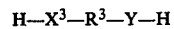

at 50° to 200° C. with a 0.8-molar to 1.2-molar quantity of a diamine of the formula (D)

H—$X^3$—$R^3$—Y—H     (D)

in which $X^3$ and Y have the meaning which is indicated in claim 1, but is limited to the bifunctional compounds, in order to obtain polymeric bis-triazinylimides, the reactions being carried out in inert organic solvents and in the presence of equivalent quantities of an inorganic base as a hydrogen halide acceptor.

* * * * *

UNITED STATES PATENT AND TRADEMARK OFFICE
CERTIFICATE OF CORRECTION

PATENT NO. : 4,471,417

DATED : September 11, 1984

INVENTOR(S) : Hartmut Wiezer et al

It is certified that error appears in the above-identified patent and that said Letters Patent is hereby corrected as shown below:

In column 1, line 55, structural formula (VI), the circle (aromatic ring notation) in the center of the hexagonal ring should be deleted;

First line of the claims (column 15, line 13) for "triazinylamide" read -- triazinylimide --;

In structural formula (IV) (column 15, lines 36-41), for "$(CH_2)_8$" (column 15, line 39) read -- $(CH_2)_s$ --;

In structural formula (VI) (column 15, lines 52-58), for "$H_3C$" (column 15, line 52) read -- $CH_3$ --;

In the penultimate line of the claim (column 16, line 49) "$X^3$ are" should read -- $X^3$ and Y are --;

In claim 2 (column 16, line 51 through column 18, line 28), in the first line of claim (column 16, line 5), for "triazinyl-amide" should read -- triazinylimide --;

In structural formula (IV) (column 17, lines 9-14), for "$(CH_2)_8$" (column 17, line 13) read -- $(CH_2)_s$ --;

UNITED STATES PATENT AND TRADEMARK OFFICE
CERTIFICATE OF CORRECTION

PATENT NO. : 4,471,417

DATED : September 11, 1984

INVENTOR(S) : Hartmut Wiezer et al

It is certified that error appears in the above-identified patent and that said Letters Patent is hereby corrected as shown below:

In structural formula (VI) (column 17, lines 26-33), for "$H_3C$" (column 17, line 26) read -- $CH_3$ --.

Signed and Sealed this

Twenty-third Day of September 1986

[SEAL]

Attest:

DONALD J. QUIGG

Attesting Officer

Commissioner of Patents and Trademarks